United States Patent
Ehrenberg et al.

(10) Patent No.: US 10,025,600 B2
(45) Date of Patent: Jul. 17, 2018

(54) NAND-BASED VERIFIED BOOT

(71) Applicant: Google Inc., Mountain View, CA (US)

(72) Inventors: Daniel Ari Ehrenberg, San Francisco, CA (US); William Alexander Drewry, Nashville, TN (US)

(73) Assignee: GOOGLE LLC, Mountain View, CA (US)

( * ) Notice: Subject to any disclaimer, the term of this patent is extended or adjusted under 35 U.S.C. 154(b) by 143 days.

(21) Appl. No.: 14/874,320

(22) Filed: Oct. 2, 2015

(65) Prior Publication Data

US 2017/0097830 A1    Apr. 6, 2017

(51) Int. Cl.
*G06F 12/00* (2006.01)
*G06F 9/4401* (2018.01)
*G06F 12/02* (2006.01)

(52) U.S. Cl.
CPC .......... *G06F 9/4416* (2013.01); *G06F 9/4406* (2013.01); *G06F 12/0246* (2013.01); *G06F 2212/7201* (2013.01)

(58) Field of Classification Search
None
See application file for complete search history.

(56) References Cited

U.S. PATENT DOCUMENTS

| | | | |
|---|---|---|---|
| 2006/0136705 A1* | 6/2006 | Kaimal | G06F 21/57 713/2 |
| 2007/0192610 A1 | 8/2007 | Chun et al. | |
| 2007/0220245 A1* | 9/2007 | Lu | G06F 9/44505 713/2 |
| 2008/0288762 A1* | 11/2008 | Chen | G06F 21/575 713/2 |
| 2008/0294838 A1 | 11/2008 | Houston et al. | |
| 2009/0204964 A1 | 8/2009 | Foley et al. | |
| 2011/0153910 A1* | 6/2011 | MacKenna | G06F 13/4234 711/103 |
| 2012/0005484 A1* | 1/2012 | Furusawa | G06F 21/575 713/189 |

(Continued)

FOREIGN PATENT DOCUMENTS

EP    2741228 A2    6/2014

OTHER PUBLICATIONS

Arm Limited, "ARM Security Technology—Buildng a Secure System Using TrustZone Technology," Apr. 2009, retrieved from http://infocenter.arm.com/help/topic/com.arm.doc.prd29-genc-009492c/PRD29-GENC-009492C_trustzone_security_whitepaper.pdf, 108 pages.

(Continued)

*Primary Examiner* — John A Lane
(74) *Attorney, Agent, or Firm* — McDermott Will & Emery LLP

(57) ABSTRACT

A device including a NAND-flash memory comprising a read-only portion storing boot code and a key, and a system on a chip (SoC) coupled to the NAND-flash memory is provided. The SoC includes a read-only memory (ROM) storing one or more instructions and a processor configured to execute, upon startup, the one or more instructions stored in the ROM to request from the NAND-flash memory the boot code and the key. The processor further configured to load and execute the boot code to perform a chain of trust verification process on subsequent code during a booting process using the key. A method for using the device is also presented.

18 Claims, 6 Drawing Sheets

(56) References Cited

U.S. PATENT DOCUMENTS

| | | | |
|---|---|---|---|
| 2012/0072651 A1* | 3/2012 | Randell | G06F 11/1068 |
| | | | 711/103 |
| 2012/0165640 A1* | 6/2012 | Galley | G06F 19/3456 |
| | | | 600/365 |
| 2013/0027865 A1* | 1/2013 | Ge | G06F 1/1666 |
| | | | 361/679.16 |
| 2014/0133227 A1 | 5/2014 | Lee et al. | |
| 2014/0244993 A1* | 8/2014 | Chew | G06F 21/445 |
| | | | 713/2 |
| 2015/0106018 A1* | 4/2015 | Robinson | G01V 11/00 |
| | | | 702/11 |
| 2015/0188707 A1* | 7/2015 | Gehrer | H04L 9/14 |
| | | | 380/30 |
| 2015/0229471 A1* | 8/2015 | Nair | H04L 9/0822 |
| | | | 713/171 |
| 2016/0048694 A1* | 2/2016 | Martinez | G06F 21/606 |
| | | | 713/193 |
| 2016/0080377 A1* | 3/2016 | Lambert | G06F 21/575 |
| | | | 713/171 |
| 2016/0105280 A1* | 4/2016 | Kinshumann | H04L 9/0825 |
| | | | 713/166 |
| 2016/0328565 A1* | 11/2016 | Jaber | G06F 21/575 |
| 2017/0149573 A1* | 5/2017 | Sadhasivan | H04L 9/3278 |
| 2017/0177874 A1* | 6/2017 | Kocher | G06F 21/575 |
| 2017/0244562 A1* | 8/2017 | He | H04L 9/0894 |

OTHER PUBLICATIONS

International Search Report and Written Opinion from PCT/US2016/052711, dated Dec. 23, 2016, 10 pages.

\* cited by examiner

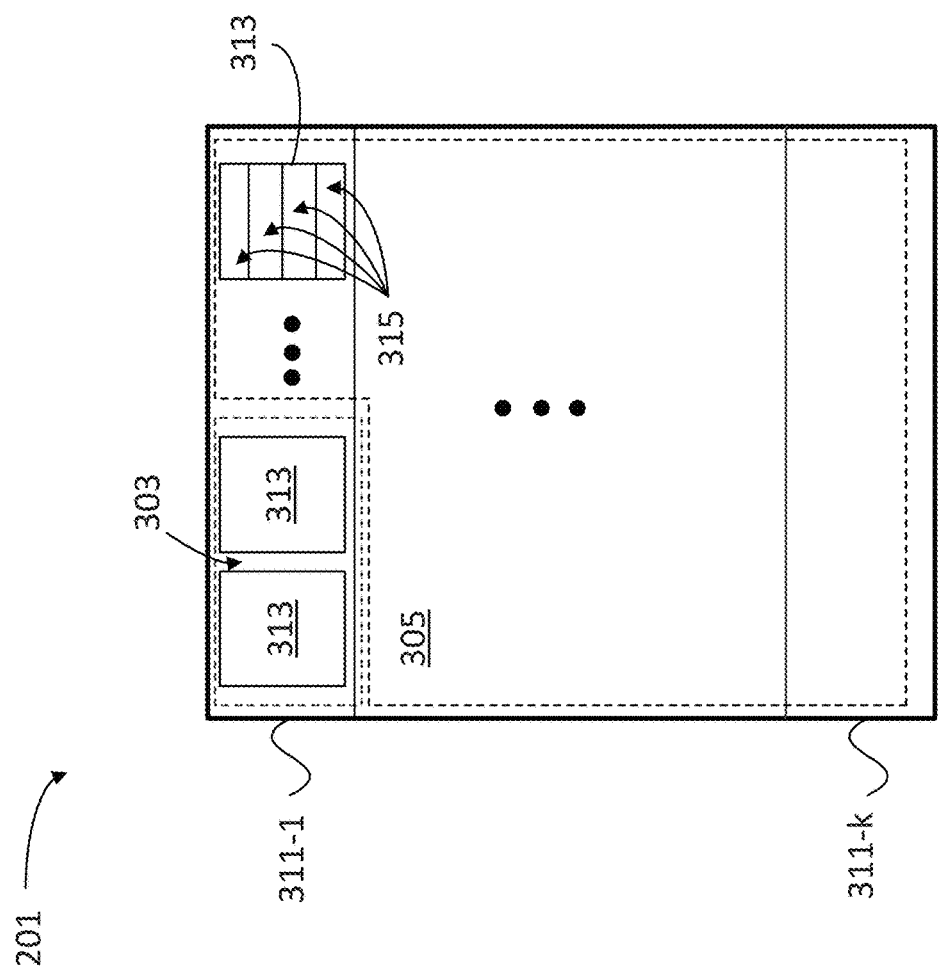

NAND-BASED VERIFIED BOOT

BACKGROUND

Field

The present disclosure generally relates to computers, and more particularly to providing a NAND-verified root boot process for computers embedded in electronic devices.

Description of Related Art

Personal electronic devices available today continue to increase in processing performance and improve in mobility due to reduced sizes. System on a Chip (SoC) architectures have become a standard device architecture for many of these personal electronic devices, which can be smartphones, tablet devices, laptop devices, wearable devices, or other electronic devices such as routers and related networking hardware, including set top boxes (STBs) and multimedia playing devices. However, in the context of some operating systems the level of boot security provided by the SoC may not be sufficient to prevent malicious break into the electronic device and unauthorized access to the electronic device resources and data.

SUMMARY

In a first embodiment, a device includes a NAND-flash memory having a read-only portion storing boot code and a key. The device further includes a system on a chip (SoC), coupled to the NAND-flash memory. In some embodiments, the SoC includes a read-only memory (ROM) storing one or more instructions, and a processor configured to execute, upon startup, the one or more instructions stored in the ROM to request from the NAND-flash memory the boot code and the key. The processor may be further configured to load and execute the boot code to perform a chain of trust verification process on subsequent code during a booting process using the key.

In a second embodiment, a method for booting an electronic device includes executing a command stored in a read-only memory (ROM) of a system on a chip (SoC) to request boot code and a key stored in a read-only portion of a NAND-flash memory. The method may include loading and executing the boot code to perform a chain of trust verification process on subsequent code during a boot process using the key. The subsequent code may be stored in a read-write portion of the NAND-flash memory. Further, the method may include stopping the boot process when the chain of trust verification process returns an invalid signature, and loading and executing an application when the chain of trust verification process successfully completes during the boot process.

In some embodiments, a non-transitory, computer-readable medium stores commands which, when executed by a processor in a system on a chip (SoC) coupled to a NAND-flash memory, cause the SoC to perform a method for booting an electronic device. Accordingly, the method includes executing a command stored in a read-only memory (ROM) of the SoC to request boot code and a key stored in a read-only portion of a NAND-flash memory, loading and executing the boot code to perform a chain of trust verification process on subsequent code during a boot process using the key, wherein the subsequent code is stored in a read-write portion of the NAND-flash memory, and stopping the boot process when the chain of trust verification process returns an invalid signature.

In yet other embodiments, a device includes a means for data storage having a read-only portion storing boot code and a key. The device further includes a system on a chip (SoC), coupled to the means for data storage. In some embodiments, the SoC includes a read-only memory (ROM) storing one or more instructions, and a processor configured to execute, upon startup, the one or more instructions stored in the ROM to request from the means for data storage the boot code and the key. The processor may be further configured to load and execute the boot code to perform a chain of trust verification process on subsequent code during a booting process using the key.

BRIEF DESCRIPTION OF THE DRAWINGS

FIG. 3A illustrates a NAND-flash memory partitioned into a read-only portion and a read-write portion, according to some embodiments.

In the figures, elements with the same or similar reference numerals have the same or similar function or steps, unless otherwise indicated.

DETAILED DESCRIPTION

Figure 1:
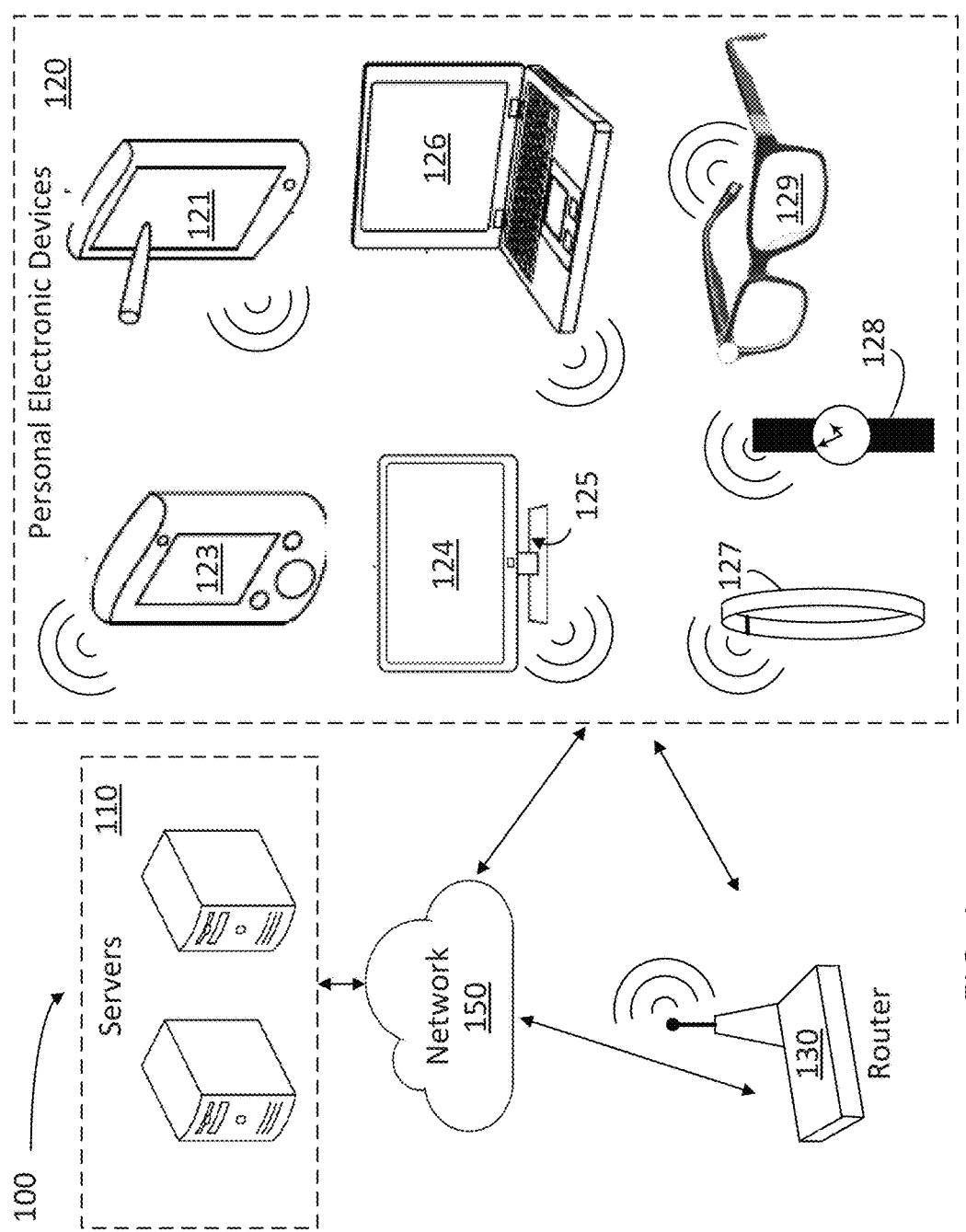
FIG. 1 illustrates an example architecture including electronic devices with NAND-flash memory based verified boot, and their relationship to one another, according to some embodiments.

In the following detailed description, numerous specific details are set forth to provide a full understanding of the present disclosure. It will be apparent, however, to one ordinarily skilled in the art that embodiments of the present disclosure can be practiced without some of these specific details. In other instances, well-known structures and techniques have not been shown in detail so as not to obscure the disclosure.

Electronic devices consistent with the present disclosure include non-volatile memory circuits having processing capability, such as NAND-type flash memories, to provide memory storage capability to a SoC embedded in the electronic device. As the complexity of the SoCs increases, electronic devices according to some embodiments include a verified boot feature that restricts operation of the electronic device by un-authorized sources. In some embodiments, a verified boot as disclosed starts an operating system for file management and application execution by running at least some commands stored in a NAND-flash memory external to the SoC. The verified boot feature included in embodiments consistent with the present disclosure restricts the software and hardware resources handled by the SoC to authorized sources. This strategy enhances proprietary value for service providers such as media outlets, and avoids introduction of malicious software into an electronic device. Secure access to electronic devices is desirable to prevent remote access to the device from a malicious party, especially when these devices handle highly sensitive personal information, or valuable proprietary information.

Embodiments consistent with the present disclosure include a root of trust configured in a read-only portion of a NAND-flash memory coupled to the SoC to handle the initial stage of boot. Use of a NAND-flash may be desirable because NOR-flash memory architectures tend to be expensive and are typically slower. Further, NAND-flash memories are desirable over disks for storage in mobile/embedded devices because they are solid state devices without moving parts. Accordingly, electronic devices incorporating NAND-flash memories are rugged with respect to vibration and shock. Moreover, the cost of storage for NAND-flash memories is substantially lower than disks at the small memory capacity used in electronic devices and appliances. In some computer applications, such as in network servers, NAND-flash memories may be desirable for their fast performance (e.g., as compared to a NOR-flash memory).

Embodiments disclosed herein include a verified boot process that starts by executing commands in the SoC to access a private key stored in a read-only portion of a NAND-flash memory. The executed commands cause firmware stored in the read-only portion of the NAND-flash memory to verify subsequent stages on the boot process. Thus, a chain of trust disclosed herein verifies signatures in the read-write portion of the NAND-flash memory using the private key as the boot process continues. A trusted private key stored in the read-only portion of the NAND-flash memory enables a large and strong encryption to be used for every boot process of the electronic device. Thus, the boot process is a verified boot process because at each step of the boot process a public key is verified with the trusted private key stored in the read only portion of the NAND-flash memory. The public key at each step of the boot process may be stored in a read-write block of the NAND-flash memory. In some embodiments, multiple public keys may be stored in different read-write portions of the NAND-flash memory, which are addressed at different times during the trusted boot verification. Further, in some embodiments at least one public key may be stored in a memory circuit in the SoC (e.g., a mask ROM), for verification with the trusted private key stored in the read only portion of the NAND-flash memory during the boot process. A breakup point in the chain of trust may be identified as the boot process takes place, and the booting process stopped.

Because access to the operating system of the electronic devices is secured through root-boot verification and a trusted private key stored in the read-only portion of the NAND-flash memory, manufacturers of electronic devices as disclosed herein have better control of code and firmware installed in the electronic devices without having to rely on third parties for software security and protection (e.g., SoC manufacturers). This enables a better protection of the content provided to the electronic device (e.g., a media player downstream, or a software update). This is especially desirable for manufacturers that provide their own operating system (OS) to 'smart' electronic devices. Indeed, embodiments of the present disclosure may not rely on additional ROM in the SoC to be used as a root of trust. Accordingly, device manufacturers and service providers such as media outlets may keep their code, services, and hardware manageable within their own root/chain of trust.

FIG. 1 illustrates an example architecture 100 including electronic devices that use NAND-flash memory-based verified boot and their relationships to one another, according to some embodiments. Architecture 100 includes servers 110, personal electronic devices 120 and a router 130 connected over a network 150. More generally, personal electronic devices 120 and router 130 may include any electronic device having computational and networking capability. Personal electronic devices 120 can be, for example, a tablet computer 121 (e.g., including e-book readers and portable pad devices), a mobile device 123 (e.g., a smartphone or PDA), a set top box (STB) 125 (e.g., for a television 124), a personal computer device 126, a convertible device (e.g., tablet-to-laptop computer device), a wristband sensing device 127, a smart watch 128, a wearable display device 129, a wearable computer, a wearable smart device, or any other device having appropriate processor, memory, and communications capabilities for displaying and processing content. More particularly, personal electronic devices 120 and router 130 may be used by registered clients of one or more of servers 110. At least one of personal electronic devices 120 is configured to include and execute at least a network based application for displaying content. The network based application can be, for example, a web browser, a document or text editing program, an image editing program, a video editing program, a gaming program, a media player program, a social networking program, or any other program that displays content. The content can be, for example, a web page, a document, an image, a video, an audio file, a game, or other displayable content.

Servers 110 can be any device having an appropriate processor, memory, and communications capability for hosting the content of a web page or providing a networking service, such as a data storage, a media downstream application, or a social networking platform. Network 150 can include, for example, any one or more of a personal area network (PAN), a local area network (LAN), a campus area network (CAN), a metropolitan area network (MAN), a wide area network (WAN), a broadband network (BBN), the Internet, and the like. Further, network 150 can include, without limitation, any one or more of the following network topologies, including a bus network, a star network, a ring network, a mesh network, a star-bus network, tree or hierarchical network, and the like. Moreover, in some embodiments network 150 may be a cable network transmitting media content such as movies, video, games and the like to a personal electronic device such as STB 125.

Low cost devices such as router 130 and wearable devices 127, 128, 129 that have reduced memory requirements may benefit from embodiments of electronic devices as disclosed herein due to the low cost of NAND-flash memories relative to other memory circuitry.

Figure 2:
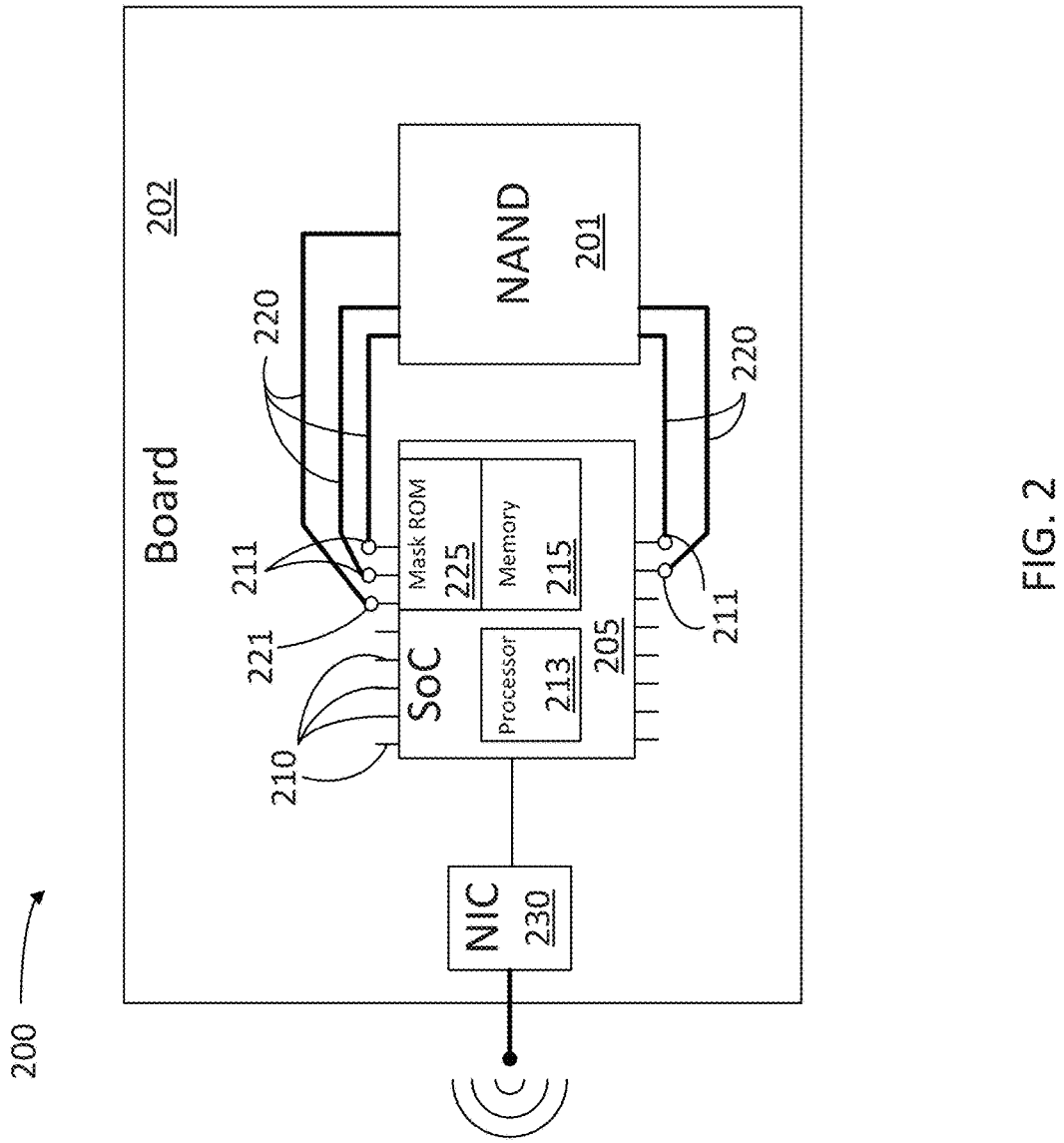
FIG. 2 illustrates a circuit board of devices as in FIG. 1 that support a NAND-flash memory coupled to a circuit on a chip (SoC), according to some embodiments.

FIG. 2 illustrates a circuit board 202 for an electronic device 200 such as any of devices 110, 120, and 130 from FIG. 1. The circuit board 202 supports a NAND-flash memory 201 coupled to a System on a Chip (SoC) 205, according to some embodiments. SoC 205 includes a processor 213 and a memory 215. Processor 213 is configured to execute a plurality of instructions stored in memory 215. When processor 213 executes the instructions stored in memory 215, it causes device 200 to perform operations associated with the electronic device, including network based applications, as disclosed herein. The network based applications may include a web-based application wherein device 200 transmits and receives data from a remote device through a network interface circuit (NIC) 230. Processor 213 includes a NAND controller circuit to provide instructions and retrieve data from NAND-flash memory 201. SoC 205 includes a mask ROM 225 storing instructions for the NAND controller circuit in processor 213. The instructions in mask ROM 225 cause SoC 205 to start and perform a booting process. In some embodiments, mask ROM 225 may store a public key matching a private key stored in NAND-flash memory 201 for performing a verified boot of electronic device 200.

SoC 205 includes a plurality of pins 210, of which boot pins 211 receive and transmit boot commands and boot data into and out of SoC 205. NAND-flash memory 201 is coupled to boot pins 211 of SoC 205 through lines 220. When SoC 205 is powered 'on,' processor 213 starts a booting process for electronic device 200 by reading and executing a command from mask ROM 225 to request a root-boot stub from a read-only portion in NAND-flash memory 201. Mask ROM 225 may include instructions which cause processor 213 to assert a lock signal on lock pin 221. The lock signal in lock pin 221 may be a 'high' or a 'low' signal to lock blocks in NAND-flash memory 201 that are configured to be locked upon receiving a 'high' or 'low' signal on the lock pin, after reading data from blocks in a read-only portion of NAND-flash memory 201 for the first time, during the root boot verification process. Thereafter, the lock signal prevents access to the locked blocks in NAND-flash memory 201 to unauthorized parties.

Embodiments of an electronic device as disclosed herein (e.g., any of devices 110, 120, and 130 of FIG. 1) include SoC 205 with the capability to boot directly from NAND-flash memory 201 by having lines 220 coupling mask ROM 225 in SoC 205 to NAND-flash memory 201, on circuit board 202. Boot pins 211 may include data pins and control pins coupled to NAND-flash memory 201. For example, in some embodiments pins 211 include eight (8) pins for data transmission and six (6) or more pins for control (e.g., including lock pin 221) of NAND-flash memory 201. In general, NAND-flash memory 201 may include other lines coupling with any one of pins 210 in SoC 205, which are not illustrated in FIG. 2 for purposes of clarity. In some embodiments, no separate component is added to SoC 205 for a verified root boot in addition to NAND-flash memory 201. Some embodiments may include a Trusted Platform Module (TPM) in circuit board 202 for rollback protection and remote attestation of the booting process. The reduced size of NAND-flash memory 201 provides circuit designers with extra real state on circuit board 202 to either install more devices (e.g., sensors), or further reduce the overall size of the electronic device.

In some embodiments, lines 220 couple block memory portions in NAND flash memory that are locked, or read-only portions, with pins 211 in SoC 205 that are configured to receive boot commands such as root boot verification commands. In some embodiments the booting process in circuit board 202 is hardwired to specific, pre-selected locations in read-only blocks of NAND flash 201, which enhances booting speed and reliability. More specifically, some embodiments include boot pins 211 coupled with memory blocks having a serial link across a plurality of logic gates in NAND-flash memory 201. For example, in some embodiments boot pins 211 are coupled to a serial port in SoC 205.

More generally, in some embodiments consistent with the present disclosure boot pins 211 in SoC are coupled with memory blocks in a memory circuit configured for serial data communication (e.g., NAND flash 201). This reduces the number of boot pins 211 in SoC and the power consumption of circuit board 202 during the booting process, with the additional advantage of simplifying the routing of lines 220 through circuit board 202 and reducing the number of bonding pads and manufacturing complexity of circuit board 202.

FIG. 3A illustrates a NAND-flash memory 201 partitioned into a read-only portion 303 and a read-write portion 305, according to some embodiments. NAND-flash memory 201 includes logical units (LUNs) 311-1 through 311-k, where k is any integer (hereinafter collectively referred to as LUNs 311). Each one of LUNs 311 includes a plurality of blocks 313, and each of blocks 313 includes a plurality of pages 315 storing data.

Accordingly, in some embodiments read-only portion 303 and read-write portion 305 are determined with a block granularity, i.e., read-only portion 303 and read-write portion 305 each include an integral number of blocks 313. Read-only portion 303 includes a plurality of blocks 313 that store read-only data. Read-write portion 305 includes a plurality of memory blocks configured as rewritable blocks, and may include elements of the booting process such as read-write firmware blocks, kernel blocks, and a root file system (rootfs) blocks among other resources used during the boot process.

Certain embodiments of the disclosed systems include a chain of trust for a booting process using a private key stored in read-only portion 303 of NAND-flash memory 201. The private key provides a root of trust for the booting process in electronic device 200. Accordingly, the root of trust is encoded in hardware circuitry that is not accessible to external parties because at least a trusted private key is stored in read-only portion 303 of NAND-flash memory 201. Accordingly, embodiments disclosed herein provide a secure and reliable boot process that uses limited amounts of memory and power resources. Moreover, electronic devices as disclosed herein include a reduced number of discrete low cost components in a reduced space.

Some embodiments of NAND-flash memory 201 include read-only features enabling a one-time program (OTP) command to lock at least one block 313 in read-only portion 303 of NAND-flash memory. The OTP command disallows further 'write' and 'erase' commands directed to the locked block. In some embodiments, the OTP command is issued in the factory to lock down 'read-only' portion 303 of NAND-flash memory 201 before shipping to customers. Thus, 'read-only' portion 303 of NAND-flash memory 201 including the verified boot commands is protected.

Embodiments consistent with the present disclosure simplify current configurations by using NAND flash memory 201 to store a strong private key and relax, and in some instances eliminate the need for the NOR flash memory in SoC 205.

Certain manufacturers provide features to make read-only portion 303 of NAND-flash memory 201 at the factory level. Accordingly, some embodiments include servicing at least read-only portion 303 for root of trust at the factory level. Typically, read-only features of NAND-flash memories are used to hold simple data such as serial numbers of components (e.g., the serial number of an associated SoC). In some embodiments, a public key in mask ROM 225 in the SoC is associated with a private key stored in read-only portion 303 of NAND-flash memory 201. Furthermore, the read-only portion 303 of NAND-flash memory 201 uses digital signature verification with the private key to verify code stored in read-write portion 305.

Figure 3B:
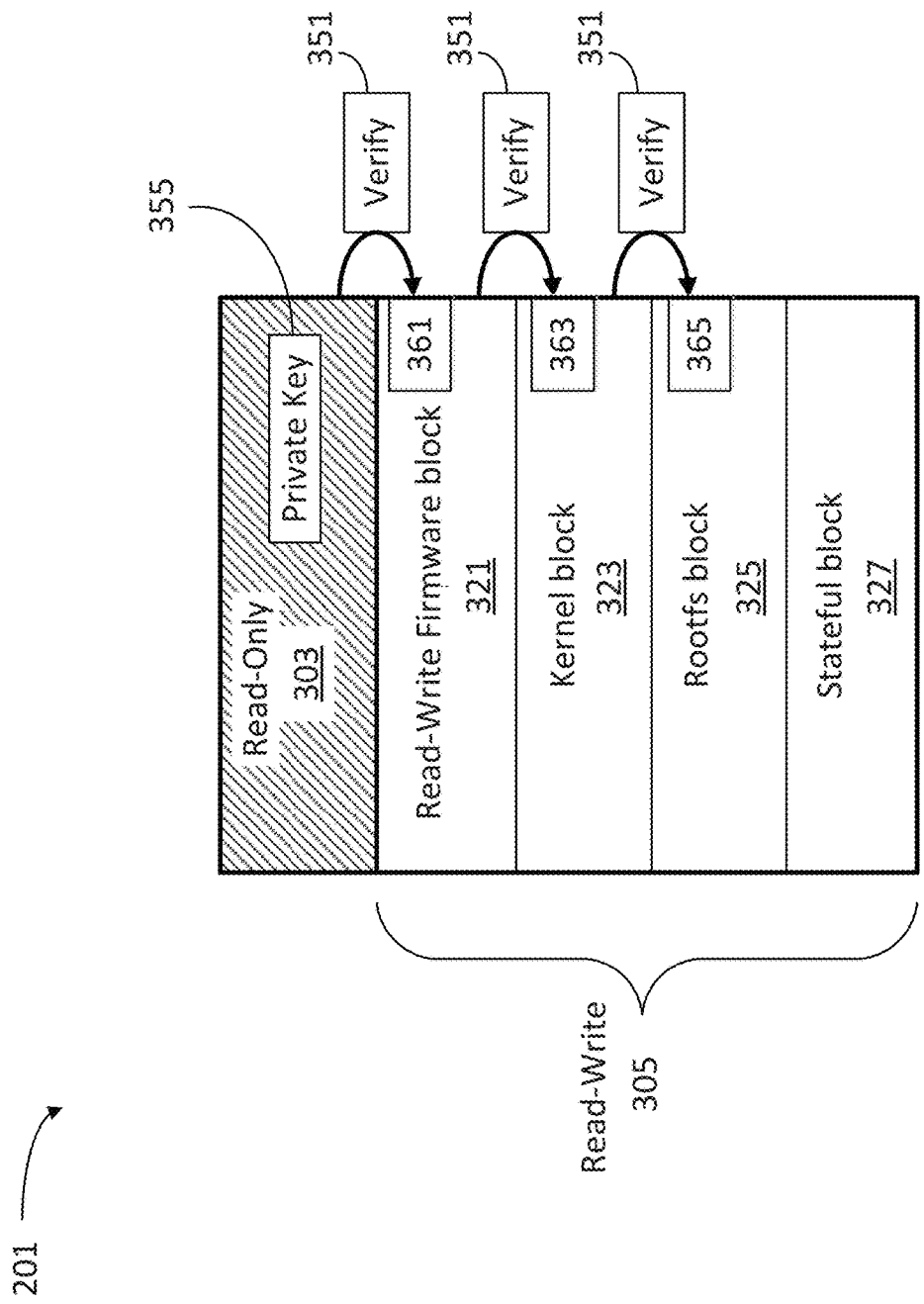
FIG. 3B illustrates a NAND-flash memory partitioned into a read-only portion and a read-write portion, according to some embodiments.

FIG. 3B illustrates NAND-flash memory 201 partitioned into a read-only portion 303 and a read-write portion 305, according to some embodiments. Read-only portion 303 includes a private key 355 for use in a verification step 351. Read-write portion 305 includes a read-write firmware block 321 including a firmware signature 361, a kernel block 323 including a kernel signature 363, a root file system ('rootfs')

block 325 including a rootfs signature 365, and a 'Stateful' partition block 327. Stateful partition block 327 may include commands in a service where subsequent requests to the service depend on the results of a first request. In some embodiments, stateful partition block 327 stores user data that changes over time (e.g., user settings for different applications run by SoC 205, including web-based applications). Firmware signature 361, kernel signature 363, and rootfs signature 365 are public keys compatible with private key 355. In some embodiments, firmware signature 361, kernel signature 363 and rootfs signature 365 are public keys having a smaller size than private key 355. For example, when private key 355 includes about 8 kbits, each one of firmware signature 361, kernel signature 363, or rootfs signature 365 may include less than about 2 kbits or 3 kbits.

While read-write portion 305 is susceptible to modification, in embodiments consistent with this disclosure only parties authorized by private key 355 may satisfy verification steps 351. Verify steps 351 ensure consistency of signatures 361, 363, and 365 with private key 355, which is safely stored in read-only portion 303. Accordingly, access to and modification of files in read-write portion 305 is subject to a high authorization standard that precludes malicious parties from taking control of electronic device 200. Thus, embodiments consistent with the present disclosure avoid the risks of performing a boot process that is verified from mask ROM 215 in SoC 205. Indeed, mask ROM 215 in SoC 205 may be vulnerable to external attack by malicious parties because mask ROM 215 typically has storage capacity for a limited-size (and thus weaker) encrypted key for boot verification (e.g., 2048 bit key, or smaller). In embodiments consistent with the present disclosure, private key 355 may include 8 kb, or even more. Accordingly, NAND-flash memory 201 provides better security and for a longer life span than current verified boot processes, as a bigger encrypted private key 355 may sustain more wear and tear errors before becoming un-correctable. In some embodiments, to correct for wear and tear NAND-flash memory 201 may include error correcting mechanisms, which will allow private key 355 to be read more times before it becomes un-correctable due to excessive read errors.

Moreover, embodiments as disclosed herein ensure the release of new software stored in read-write NAND portion 305 only when the source has access to private key 355. This is because the software in read-write NAND portion requires public keys compatible with private key 355, which is stored in read-only portion 303 of NAND. If private key 355 were stored in mask ROM 225, as is the case in state-of-the-art devices, there is no guarantee for a software developer (e.g., an application developer) that SoC is sufficiently protected from malicious access by a third party. Moreover, state-of-the-art configurations implementing boot verification using encrypted keys stored in mask ROM 225 have weaker encryption compared to embodiments disclosed herein because the size constraints in mask ROM 225 limit the size of the private key.

In some embodiments, verify step 351 is performed during a verified boot process when the read-only NAND portion 303 includes commands to direct processor 213 to request access to data from read-write firmware portion 321. Verify step 351 may be performed by SoC 205 and may include matching private key 355 with firmware signature 361. Verify step 351 may be carried out during the verified boot process more than once, to access data in kernel 323 multiple times, when the read-write firmware block 321 has been verified and accessed. The code from the respective blocks 321, 323, 325, and 327 is verified using the respective signatures 361, 363, 365, and the private key 355. Once the code has been verified, it is safe for processor 213 in the SoC to execute the code. The instances where verify step 351 is carried out form a verification sequence that may referred to as a 'chain of trust' for the booting process. The successful completion of the chain of trust steps confirms that the boot process is legitimate and that the software in control of SoC has a recognized and authorized source.

Figure 4:
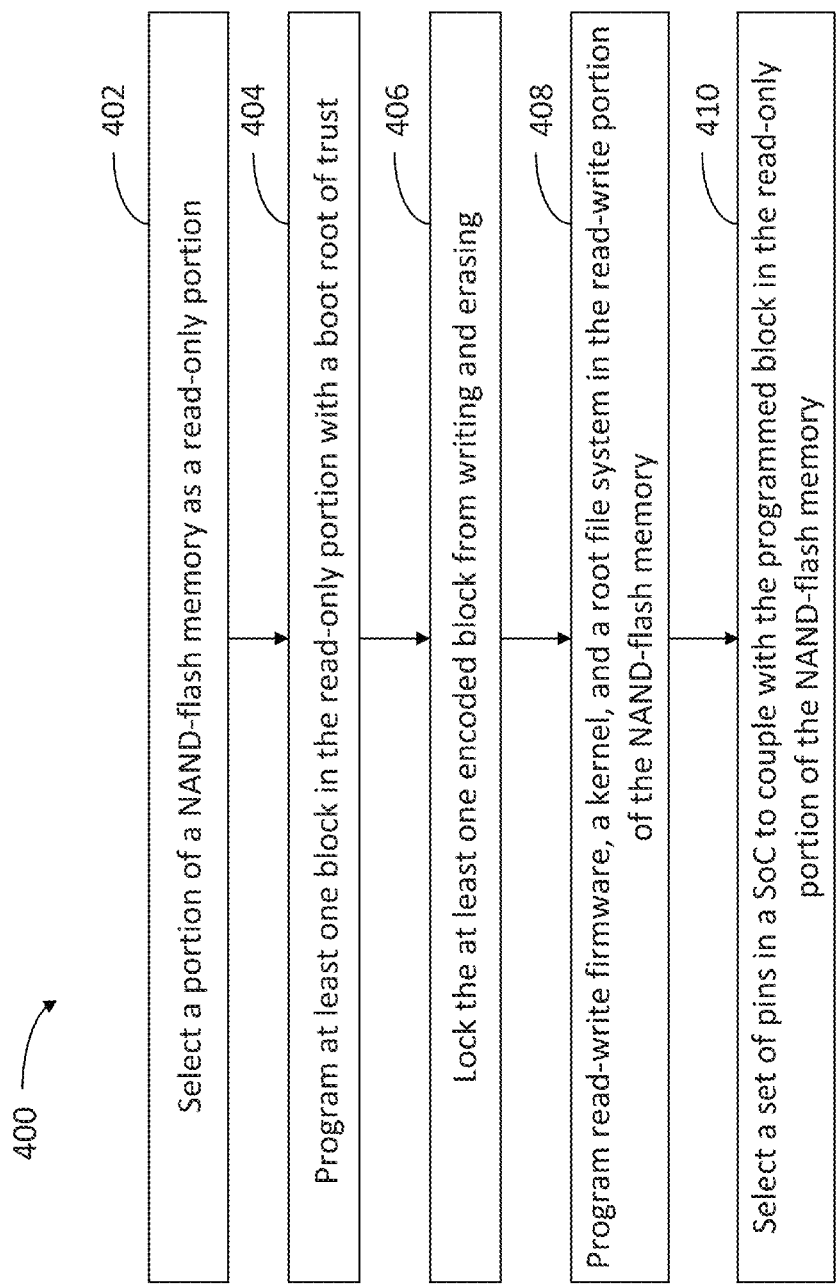
FIG. 4 illustrates a flowchart illustrating a method for configuring a NAND-flash memory for verified boot, according to some embodiments.

FIG. 4 illustrates flowchart illustrating a method 400 for configuring a NAND-flash memory for verified boot, according to some embodiments. An electronic device in method 400 may be a server, a personal electronic device, or a router consistent with the present disclosure (e.g., servers 110, personal electronic devices 120, and router 130). Further, the NAND-flash memory in method 400 may be coupled to a SoC on a circuit board, as disclosed herein (e.g., NAND-flash memory 201, SoC 205, and circuit board 202). The verified boot may include verification of a plurality of public keys or signatures with a private key (e.g., private key 355, firmware signature 361, kernel signature 363, and rootfs signature 365). In some embodiments, a method consistent with the present disclosure may include at least one or more of the blocks in method 400 performed in a different order, overlapping in time, or even simultaneously.

Block 402 includes selecting a portion of a NAND-flash memory as a read-only portion. Block 404 includes programming at least one block in the read-only portion with a boot root of trust. In some embodiments, block 404 includes storing a private key in the read-only portion of the NAND flash memory. In some embodiments, block 404 includes writing a block of firmware code in the boot root of trust. The firmware code may include data and commands for signature verification, such as private key 355. Further, in some embodiments block 404 includes writing in the block of firmware code data and commands to load and verify a subsequent stage in the boot process. In some embodiments, block 404 includes writing in the block of firmware data and commands to perform a boot process in recovery mode, when a failure is encountered.

Block 406 includes locking the at least one encoded block from being written and/or erased. Block 406 may include using a suitable interface for a specific NAND-flash memory. In some embodiments, a NAND-flash memory includes an interface similar to that of a NOR-flash memory circuit having a lock pin (e.g., lock pin 221). In some embodiments, block 406 may include issuing an OTP command from the SoC. In some embodiments, block 406 may be automatically completed when block 404 is performed on the NAND-flash memory including a designated OTP area. In yet other embodiments, block 406 may include providing an instruction to make a block of the NAND-flash memory OTP after the block is written according to block 404.

Block 408 includes programming a read-write firmware block, a kernel block, and a root file system block in the read-write portion of the NAND-flash memory, with a firmware signature, a kernel signature, and a root file system signature, respectively. In some embodiments, block 408 includes encoding the kernel, the root file system, and read-write firmware on standard flash file systems. In some embodiments, block 408 includes encoding a kernel using well-known programs such as 'nandwrite' in data formats such as a 'raw blob.' In some embodiments, block 408 includes storing the root file system in the NAND-flash memory according to unsorted block image file system (UBIFS) protocols. Accordingly, in some embodiments block 408 includes forming virtual layers of block devices using a device mapper (dm). For example, in some embodiments block 408 includes providing read-only transparent integrity checking of memory blocks using a mapping table that includes a kernel source (e.g., 'dm-verity'). In some embodiments block 408 includes encoding the root file system in a compressed, read-only file system (e.g., 'SquashFS'). This configuration may be suitable for constrained block device and memory systems such as embedded systems, where a low overhead is desirable. Further according to some embodiments, block 408 includes forming a suitable partition in the read-write portion of the NAND-flash memory according to UBIFS protocols.

Block 410 includes selecting a set of pins in a system on a chip (SoC) to couple with the at least one programmed block in the read-only portion of the NAND-flash memory. In some embodiments, block 410 includes selecting lines for data and selecting lines for control commands in a bus coupling the SoC and the NAND-flash memory (e.g., lines 220). For example, some devices may include a NAND bus with fourteen (14) lines, of which eight (8) lines are selected in block 410 to transmit data, and six (6) lines are selected in block 410 to transmit control commands.

Figure 5:
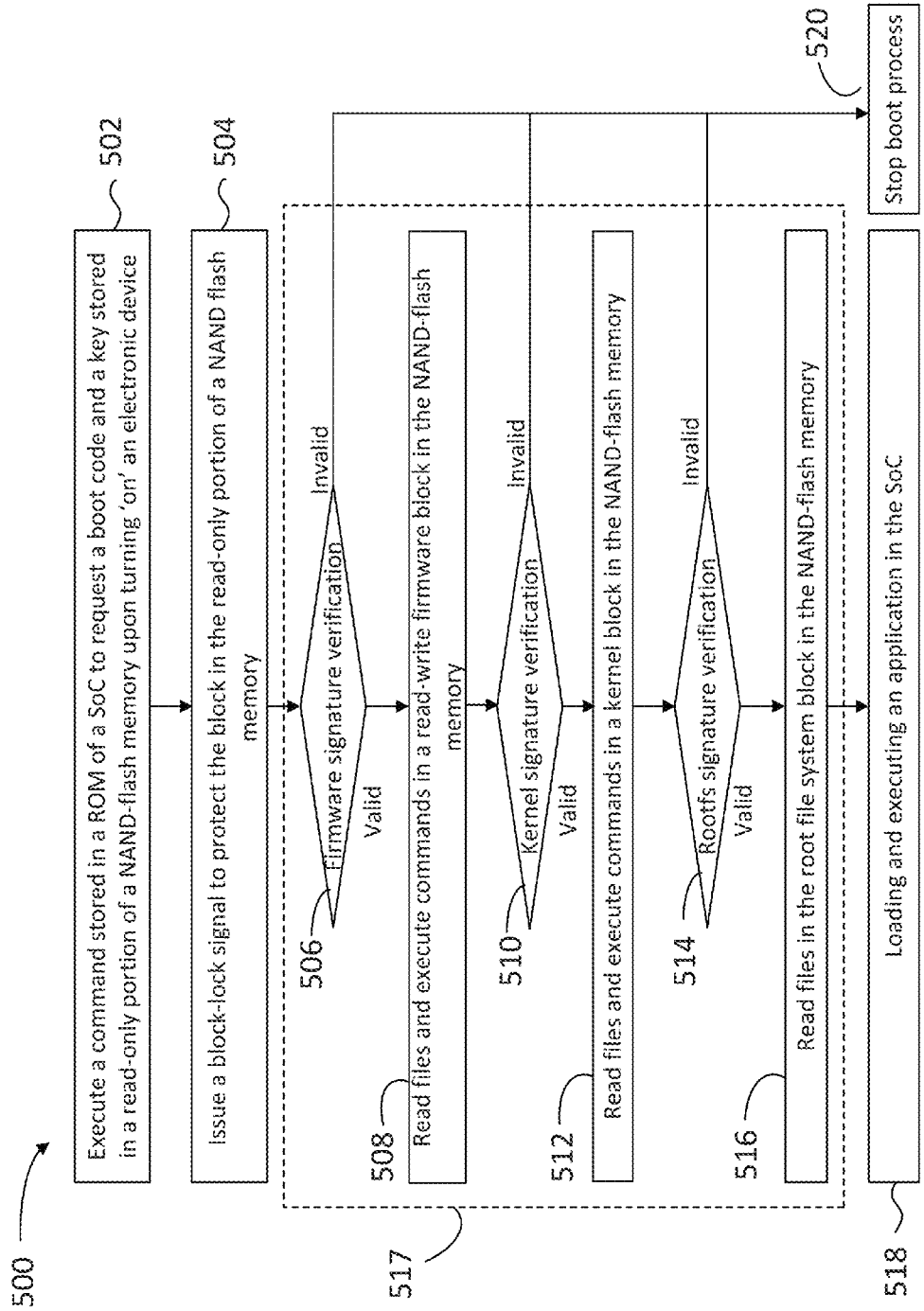
FIG. 5 illustrates a flowchart illustrating a method for booting an electronic device using a NAND-flash memory, according to some embodiments.

FIG. 5 illustrates a flowchart illustrating a method 500 for booting an electronic device using a NAND-flash memory, according to some embodiments. An electronic device in method 500 may be a server, a personal electronic device, or a router including a SoC consistent with the present disclosure (e.g., servers 110, personal electronic devices 120, router 130, and SoC 205). Further, the NAND-flash memory in method 500 may be coupled to the SoC through a plurality of lines on a circuit board connected to pins on the SoC. The SoC includes a processor, a memory, and a mask ROM circuit as disclosed herein (e.g., NAND-flash memory 201, pins 211 and 221, lines 220, circuit board 210, processor 213, memory 215 and mask ROM 215). The NAND-flash memory may include a read-only portion, and a read-write portion, each portion formed at a block granularity (e.g., read-only portion 303, read-write portion 205, and blocks 313). Accordingly, the read-only portion of the NAND-flash memory includes a private key for use in verification steps included in some embodiments of method 500 (e.g., private key 355 and verification steps 351). In some embodiments, the read-write portion may include a read-write firmware block, a kernel block, a root file system block, and a stateful partition block (e.g., read-write firmware block 321, kernel block 323, rootfs block 325, and stateful partition block 327).

Method 500 may be performed by the processor in the SoC upon turning 'on' the electronic device. Moreover, in some embodiments, a method consistent with the present disclosure may include at least one or more of the steps in method 500 performed in a different order, overlapping in time, or even simultaneously.

Block 502 includes executing a command in the ROM included in the SoC, the command requesting a root boot code and a key stored in a read-only portion of a NAND-flash memory upon turning 'on' the electronic device. Block 502 may include matching a public key stored in the mask ROM of the SoC with the private key stored in the read-only portion of the NAND-flash memory. In some embodiments, block 502 includes providing a read command to the NAND-flash memory to read the read-only portion of the NAND-flash memory. The read command may be provided via a command-based interface such as open NAND flash interface (ONFI), without limitation as to the specific interface suitable for a given application.

Block 504 includes issuing a block-lock signal to protect the block in the read-only portion of a NAND-flash memory. Further, embodiments consistent with the present disclosure include issuing a block-lock signal early in the booting process to provide greater flexibility for the NAND-flash memory configuration at a later stage. In some embodiments, block 504 includes issuing the block-lock signal through the lock pin. In some embodiments, block 504 may include selecting a plurality of blocks in the NAND-flash memory that are going to be locked, and then locking the selected blocks using their respective addresses.

Block 506 includes requesting a firmware signature verification from the NAND-flash memory. Accordingly, block 506 may include verifying by the processor in the SoC that the private key in the read-only portion of the NAND-flash memory and a firmware signature stored in the read-write firmware are compatible. Block 508 includes reading files and executing commands in the read-write firmware block in the NAND-flash memory when the firmware signature is valid. Block 510 includes a kernel signature verification. In some embodiments, block 510 includes verifying a kernel signature stored in the kernel of the read-write portion of the NAND-flash memory using the private key in the read-only NAND-flash portion. When the kernel signature is valid according to block 510, block 512 includes reading files and executing commands in the kernel of the NAND-flash memory. Block 514 includes a root file system signature verification. In some embodiments, block 514 includes verifying a root file system signature in a root file system of a read-write portion of the NAND-flash memory using the private key in the read-only NAND-flash portion. When the root file system signature is valid according to block 514, block 516 includes reading files and executing commands in the root file system of the NAND-flash memory.

Loading and executing the boot code on subsequent code during a boot process using the key as illustrated in steps 506 through 516 may be included in a general block 517 as a chain of trust verification process. The subsequent code is stored in blocks 321, 323, 325 and 327 of a read-write portion of the NAND-flash memory. When any of the signature verification blocks 506, 510 and 514 returns an invalid signature, the boot process is stopped in block 520, according to some embodiments. In some embodiments, block 520 includes setting the SoC in recovery mode if a signature violation is detected in any one of blocks 506, 510, and 514.

When chain of trust verification process in block 517 is successfully completed, block 518 includes loading and executing an application in the SoC. In some embodiments, block 518 includes accessing files and commands from the Stateful service in the read-write portion of the NAND-flash memory. The application may include a service operation in communication with the network through the NIC circuit.

Method 500 may be performed in the context of a 'reboot' after software is installed, or updated, in the electronic device. This may be the case for example when a user is installing new video playing software in an STB to play higher resolution or better quality video. In such embodiments, it is desirable for the electronic device manufacturer and for the media provider to ensure that the updates and installed software are legitimate.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a PAN, a LAN, a CAN, a MAN, a wide area network WAN, a BBN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

The term "machine-readable storage medium" or "computer readable medium" as used herein refers to any medium or media that participates in providing instructions or data to a processor for execution (e.g., processor 213). Such a medium may take many forms, including, but not limited to, non-volatile media, volatile media, and transmission media. Non-volatile media include, for example, optical disks, magnetic disks, or flash memory. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C. To the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A device comprising:
   a NAND-flash memory comprising a read-only portion storing boot code and a private key; and
   a system on a chip (SoC), coupled to the NAND-flash memory, the SoC comprising:
      a read-only memory (ROM) storing one or more instructions; and
      a processor configured to:
         execute, upon startup, the one or more instructions stored in the ROM to request from the NAND-flash memory the boot code and the private key; and
         load and execute the boot code to perform a chain of trust verification process on subsequent code during a booting process using the private key, wherein the chain of trust verification process includes verifying a public key stored in the SoC based on the private key from the NAND-flash memory.

2. The device of claim 1, further comprising a network interface circuit configured to couple with a remote device, and wherein the processor is further configured to transmit and receive data from the remote device through the network interface circuit when the booting process is completed.

3. The device of claim 1, further comprising a circuit board, the circuit board comprising lines to couple the NAND-flash memory with the SoC through a plurality of pins, wherein one of the pins is a lock pin configured to provide a lock signal to lock one or more blocks in the NAND-flash memory.

4. The device of claim 1, further comprising a trusted platform module (TPM) coupled to the SoC and configured to provide rollback protection and remote attestation of the booting process when requested by the processor.

5. The device of claim 1, wherein the SoC comprises a mask read-only memory (ROM).

6. The device of claim 1, wherein the NAND-flash memory includes a read-write portion comprising a plurality of blocks, each block storing a signature to be verified with the private key in the chain of trust verification process.

7. The device of claim 1, wherein the NAND-flash memory includes a read-write portion storing code to be loaded and executed as the chain of trust verification process proceeds during the boot process.

8. A method for booting an electronic device, comprising:
executing a command stored in a read-only memory (ROM) of a system on a chip (SoC) to request boot code and a private key stored in a read-only portion of a NAND-flash memory;
loading and executing the boot code to perform a chain of trust verification process on subsequent code during a boot process using the private key, wherein the subsequent code is stored in a read-write portion of the NAND-flash memory, and the chain of trust verification process includes matching a public key stored in the ROM of the SoC with the private key;
stopping the boot process when the chain of trust verification process returns an invalid signature; and
loading and executing an application when the chain of trust verification process successfully completes during the boot process.

9. The method of claim 8, further comprising issuing a block-lock command to protect the block in the read-only portion of the NAND-flash memory.

10. The method of claim 9, wherein issuing a block-lock command comprises providing a block-lock signal to the NAND-flash memory through a lock pin in the SoC.

11. The method of claim 8, wherein the read-write portion of the NAND-flash memory comprises:
a firmware signature in a read-write firmware block;
a kernel signature in a kernel block; and
a root file system signature in a root file system block, and wherein performing a chain of trust sequence comprises:
verifying the firmware signature with the private key;
reading files and executing commands in the read-write firmware when the firmware signature is valid;
verifying the kernel signature with the private key;
reading files and executing commands in the kernel when the kernel signature is valid;
verifying the root file system signature with the private key; and
reading files and executing commands in the root file system when the root file system signature is valid.

12. The method of claim 8, wherein loading and executing the application comprises reading files and executing commands in a Stateful partition of the read-write portion of the NAND-flash memory, the Stateful partition comprising user settings for the application to be executed by the electronic device.

13. The method of claim 8, wherein loading and executing the application comprises starting a web-based application, and communicating with a server using a network interface circuit (NIC) coupled to the SoC in the electronic device.

14. A non-transitory, computer-readable medium storing commands which, when executed by a processor in a system on a chip (SoC) coupled to a NAND-flash memory, cause the SoC to perform a method for booting an electronic device, the method comprising:
executing a command stored in a read-only memory (ROM) of the SoC to request boot code and a private key stored in a read-only portion of a NAND-flash memory;
loading and executing the boot code to perform a chain of trust verification process on subsequent code during a boot process using the private key, wherein the subsequent code is stored in a read-write portion of the NAND-flash memory, wherein the chain of trust verification process further comprises matching a public key stored in the ROM of the SoC with the private key; and
stopping the boot process when the chain of trust verification process returns an invalid signature.

15. The non-transitory, computer-readable medium of claim 14, wherein the commands further cause the SoC to issue a block-lock command to protect the block in the read-only portion of the NAND-flash memory.

16. The non-transitory, computer-readable medium of claim 15, wherein issuing a block-lock command comprises providing a block-lock signal to the NAND-flash memory through a lock pin in the SoC.

17. The non-transitory, computer-readable medium of claim 14, wherein the commands causing the SoC to perform loading and executing an application comprise commands for reading files and executing commands in a Stateful partition of the read-write portion of the NAND-flash memory, the Stateful partition comprising user settings for the application to be executed by the electronic device.

18. The non-transitory, computer-readable medium of claim 14, wherein the commands causing the SoC to perform loading and executing an application comprise commands for starting a web-based application, and communicating with a server using a network interface circuit (NIC) coupled to the SoC in the electronic device.

* * * * *